(12) United States Patent
Roy

(10) Patent No.: US 11,648,854 B1
(45) Date of Patent: *May 16, 2023

(54) AUTONOMOUS VEHICLE ADAPTED FOR SLEEPING OR RESTING IN A RECLINED POSTURE

(71) Applicant: Matthew Roy, Montreal (CA)

(72) Inventor: Matthew Roy, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,863

(22) Filed: Nov. 26, 2022

Related U.S. Application Data

(63) Continuation of application No. 17/750,353, filed on May 22, 2022, now Pat. No. 11,548,412, which is a continuation of application No. 16/293,797, filed on Mar. 6, 2019, now Pat. No. 11,351,892.

(60) Provisional application No. 62/641,375, filed on Mar. 11, 2018.

(51) Int. Cl.
| | |
|---|---|
| *B60N 2/02* | (2006.01) |
| *B60R 1/062* | (2006.01) |
| *B60N 2/806* | (2018.01) |
| *B60H 1/00* | (2006.01) |
| *B62D 1/183* | (2006.01) |
| *G05D 1/02* | (2020.01) |
| *B60R 22/18* | (2006.01) |
| *B60R 21/20* | (2011.01) |
| *B60R 11/02* | (2006.01) |
| *B60N 2/20* | (2006.01) |
| *B60N 2/10* | (2006.01) |
| *B60R 11/00* | (2006.01) |

(52) U.S. Cl.
CPC ....... *B60N 2/0244* (2013.01); *B60H 1/00564* (2013.01); *B60H 1/00642* (2013.01); *B60N 2/10* (2013.01); *B60N 2/20* (2013.01); *B60N 2/806* (2018.02); *B60R 1/062* (2013.01); *B60R 11/0235* (2013.01); *B60R 21/20* (2013.01); *B60R 22/18* (2013.01); *B62D 1/183* (2013.01); *G05D 1/021* (2013.01); *B60R 2011/0028* (2013.01); *B60R 2011/0084* (2013.01); *B60R 2011/0085* (2013.01); *G05D 2201/0213* (2013.01)

(58) Field of Classification Search
CPC ........ B60N 2/0244; B60N 2/806; B60N 2/10; B60N 2/20; B60H 1/00564; B60H 1/00642; B60R 1/062; B60R 11/0235; B60R 21/20; B60R 22/18; B60R 2011/0028; B60R 2011/0084; B60R 2011/0085; B62D 1/183; G05D 1/021; G05D 2011/0213
USPC .......................................... 701/23
See application file for complete search history.

(56) References Cited

U.S. PATENT DOCUMENTS 10,858,011 B1 * 12/2020 Christensen ............ B60R 21/20
11,548,412 B1 * 1/2023 Roy ........................ B60N 2/20
(Continued)

*Primary Examiner* — Mark R Wendell

(57) ABSTRACT

A vehicle has a seat movable between an upright position and a reclined position and an automatically adjustable headrest connected to the seat, the automatically adjustable headrest being automatically adjusted for a posture of a head of a user when the user is reclined in the reclined position. The automatically adjustable headrest is automatically adjusted in response to a camera detecting that the user is sleeping or resting either on his or her back or on his or her side, the headrest being adjusted for either a side sleeping posture or a back sleeping posture.

15 Claims, 18 Drawing Sheets

(56) References Cited

U.S. PATENT DOCUMENTS

| | | | |
|---|---|---|---|
| 2007/0188004 A1* | 8/2007 | Browne | A47C 7/38 |
| | | | 297/391 |
| 2012/0086249 A1* | 4/2012 | Hotary | B60N 2/20 |
| | | | 297/284.3 |
| 2014/0265479 A1* | 9/2014 | Bennett | B60N 2/919 |
| | | | 297/217.4 |
| 2017/0334451 A1* | 11/2017 | Asakura | G05D 1/0088 |
| 2018/0052494 A1* | 2/2018 | Coburn | B60N 2/002 |
| 2018/0222490 A1* | 8/2018 | Ishihara | B60K 35/00 |
| 2019/0009695 A1* | 1/2019 | Schonfeld | B60N 2/265 |
| 2020/0164771 A1* | 5/2020 | Unnervik | B60N 2/42745 |

* cited by examiner

AUTONOMOUS VEHICLE ADAPTED FOR SLEEPING OR RESTING IN A RECLINED POSTURE

CROSS-REFERENCE TO RELATED APPLICATIONS

This application is a continuation of U.S. patent application Ser. No. 17/750,353 filed on May 22, 2022 which is a continuation of U.S. patent application Ser. No. 16/293,797 filed Mar. 6, 2019, which issued as U.S. Pat. No. 11,351,892 on Jun. 7, 2022, which claims priority from U.S. Provisional Patent Application 62/641,375 filed Mar. 11, 2018.

TECHNICAL FIELD

The present invention relates generally to self-driving or autonomous vehicles and, in particular, for technologies enhancing a user experience while sleeping or riding in a reclined seat in an autonomous or self-driving vehicle.

BACKGROUND

Autonomous or self-driving vehicles use sensors such as RADAR, LIDAR and/or cameras to provide signals to a processor or controller that generates and outputs steering, acceleration and braking signals to the vehicle. A Global Navigation Satellite System (GNSS) receiver such as a Global Positioning System (GPS) receiver is also used for navigation. As the self-driving vehicle drives autonomously toward a destination, the vehicle will encounter other self-driving vehicles. Self-driving vehicles in a given area of a road mutually sense each other's presence using various sensors for collision avoidance and may communicate, via vehicle-to-vehicle messaging protocols, with each other to avoid collisions.

Passengers riding in autonomous vehicles may wish to sleep or rest with their seats reclined. There is a need for technologies to enhance a user experience while sleeping or resting in a reclined seat in an autonomous vehicle.

SUMMARY

In general, the present invention provides an autonomous (self-driving) vehicle adapted for sleeping or resting in a reclined seat.

One inventive aspect of the disclosure is an autonomous vehicle comprising a seat movable between an upright position and a reclined position and a ceiling display for displaying user interface elements and for receiving user input when the seat is in the reclined position.

The ceiling display may be automatically movable such that the ceiling display moves automatically when the seat is reclined.

The ceiling display may be a sunroof display screen comprising a transparent touch-sensitive display. The ceiling display may be pivotable or slidable. The ceiling display may be both pivotable and slidable. The ceiling display may be slidable between a visor position and a ceiling position.

The autonomous vehicle may further comprise automatically relocatable airbags that automatically relocate when the seat is reclined.

The autonomous vehicle may further comprise an automatically relocatable seatbelt that automatically relocates when the seat is reclined.

The autonomous vehicle may further comprise a passenger-monitoring camera and automatically adjusting air vents that adjust in response to a passenger position detected by the camera.

The autonomous vehicle may further comprise a passenger-monitoring camera and an automatically adjusting headrest that adjusts in response to a passenger position detected by the camera.

The autonomous vehicle may further comprise an automatically folding steering wheel that folds automatically when the seat is reclined.

The autonomous vehicle may further comprise automatically retracting side mirrors that automatically retract when the seat is reclined.

Another inventive aspect of the disclosure is an autonomous vehicle comprising a processor to determine a predicted acceleration of the vehicle and a dynamically compensating seat supported by a plurality of actuators to compensate for the predicted acceleration of the autonomous vehicle. The actuators may automatically adjust the pitch of the seat. The actuators may automatically adjust the lateral tilt of the seat. The actuators may automatically adjust both the pitch and the lateral tilt.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Disclosed herein are various embodiments of a self-driving (autonomous) vehicle adapted for sleeping or resting in a reclined seat.

For the purposes of this specification, the term "self-driving vehicle" is meant to encompass any land vehicle such as a car, van, minivan, sports utility vehicle (SUV), crossover-type vehicle, bus, minibus, truck, tractor-trailer, semi-trailer, construction vehicle, work vehicle, tracked vehicle, semi-tracked vehicle, offroad vehicle, electric cart, dune buggy, or the like. The terms "autonomous" and "self-driving" in relation to "vehicle" are meant to encompass any vehicle having environment-detecting sensors and a processor, controller, computer, computing device or computer system for autonomously steering, accelerating and braking the vehicle, i.e. self-driving or driving autonomously, without a driver physically touching, interacting with or providing direct or immediate input to the steering wheel, accelerator pedal and brake pedal.

Figure 1:
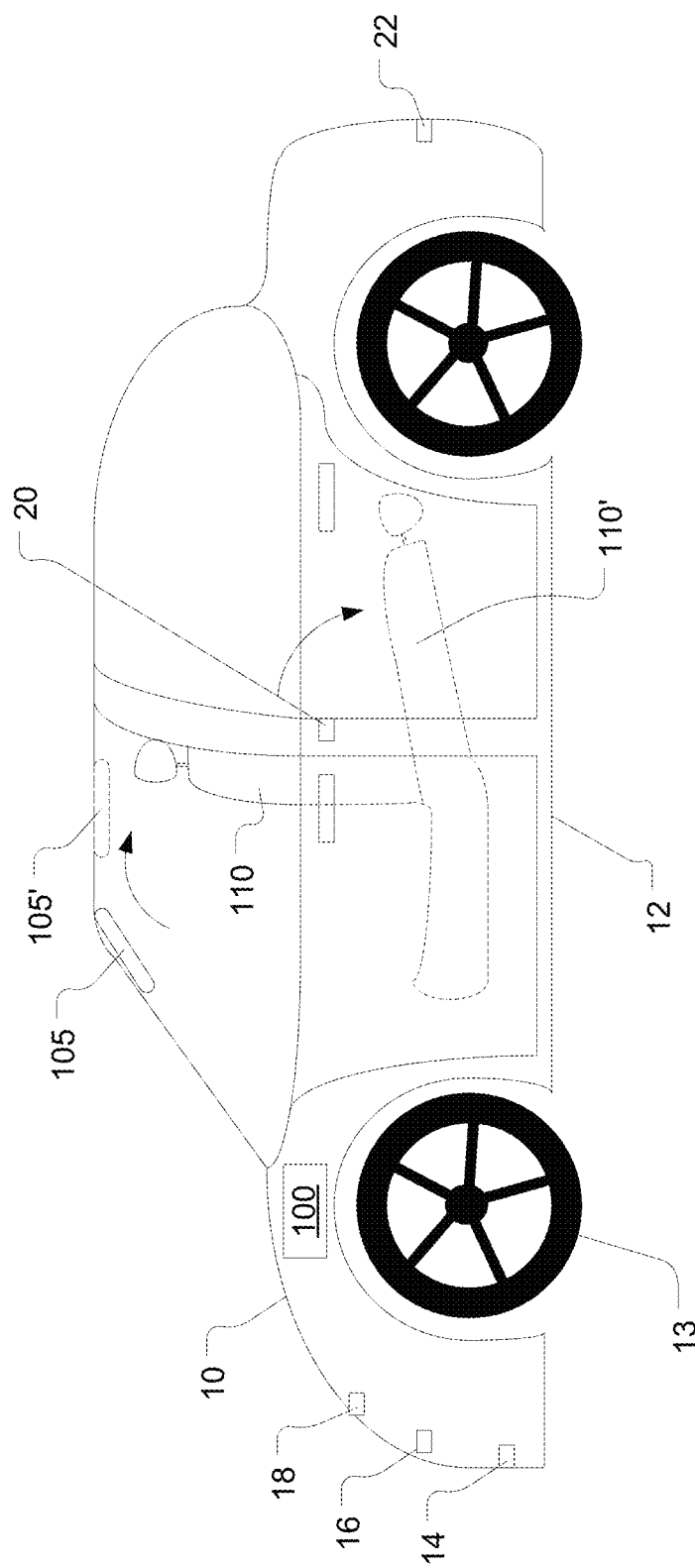
FIG. 1 is a side view of an autonomous ("self-driving") vehicle in accordance with an embodiment of the present invention in which a display screen moves automatically as a seat reclines to enable viewing and touching the display screen while resting in the reclined seat.

FIG. 1 depicts an autonomous or self-driving car 10 as one exemplary implementation of a self-driving vehicle or autonomous vehicle (AV). The self-driving vehicle or autonomous vehicle 10 includes, in the illustrated embodiment, a vehicle chassis 12 and a plurality of wheels 13, a motor supported by the chassis for providing propulsive power for the vehicle, a braking system for braking (decelerating) the vehicle and a steering system for steering the vehicle via a steering mechanism which is usually connected to the front wheels. The motor may be an internal combustion engine, e.g. a gas engine or a diesel engine. The motor may alternatively be an electric motor. The motor may be a hybrid-electric powerplant. In a variant, the vehicle may have multiple electric motors for driving different wheels. In another variant, the motor may be a hydrogen fuel cell. The vehicle may include a powertrain to transfer power from the motor to the drive wheels. For some vehicles, the powertrain may include, in addition to the motor (engine), a transmission gearbox, a drive shaft, and a differential. For an electric vehicle implementation, the vehicle includes a rechargeable battery or plurality of rechargeable batteries.

The vehicle depicted by way of example in FIG. 1 also includes a plurality of sensors i.e. environment-detecting sensors for collision avoidance. The sensors may include RADAR, LIDAR, cameras and ultrasonic rangefinders. The vehicle depicted by way of example in FIG. 1 includes a first sensor 14, a second sensor 16, a third sensor 18, and a fourth sensor 20. In the illustrated embodiment of FIG. 1, the first sensor 14 is a RADAR sensor, the second sensor 16 is a LIDAR sensor, the third sensor 18 is a camera and the fourth sensor 20 is a side view camera. A fifth sensor 22 is in this illustrated embodiment a rear (backup) camera. Additional sensors may be provided on the vehicle 10, including additional camera, additional LIDAR and RADAR sensors. A different suite of sensors may be used in other variants.

The vehicle 10 may also be a mixed-mode human-drivable and self-drivable vehicle such as a self-driving car, truck, van, etc. that can be optionally driven directly by a human driver sitting in the driver's seat in which case the vehicle has two operating modes: (i) a conventional human driver mode with a human directly driving the vehicle using the steering wheel, brake pedal and accelerator as is conventionally done with non-autonomous vehicles; (ii) a self-driving (or autonomous) mode in which the vehicle's processor or computing system drives autonomously without direct human input, whether a human is seated in the driver's seat or not.

The self-driving vehicle 10 of FIG. 1 further includes a self-driving processor 100, processors or computing device(s) configured to receive analog or digital signals (data) from the sensors and to generate steering, acceleration and braking control signals for controlling the steering system, the motor and the braking system of the vehicle. The processor 100 may generate a steering control signal, an acceleration control signal and a braking control signal based on the signals received from the sensors. The processor 100 may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a windshield defroster signal, a windshield wiper activation signal, a wiper fluid squirt signal, climate control signal, headlight activation signal, to name but a few.

The self-driving vehicle 10 depicted by way of example in FIG. 1 further includes a data transceiver, e.g. a cellular data transceiver, a satellite transceiver or any other radiofrequency data transceiver. The data transceiver may be any suitable wireless data transceiver for transmitting and receiving data wirelessly. In one main embodiment, the data transceiver is a cellular data transceiver. The data transceiver is configured to wirelessly communicate data from the vehicle to the remote control device by attaching communicatively to a base station transceiver. Data is transmitted and received over a cellular wireless network using cellular communication protocols and standards for packet data transfer such as GSM, CDMA, GPRS, EDGE, UMTS, LTE, etc. The vehicle may include a Subscriber Identity Module (SIM) card for GSM-type communications or a Re-Usable Identification Module (RUIM) card for CDMA-type communications. The data transceiver may optionally include separate voice and data channels.

The vehicle 10 may also include a Wi-Fi® transceiver and a Bluetooth® transceiver for short-range data communication with other vehicles. The vehicle 10 may also exchange V2V messages using IEEE 802.11p Dedicated Short-Range Communications (DSRC) in the 5.9 GHz band used, or to be used, by intelligent transportation systems (ITS). The DSRC messages are half duplex messages in the 5.850-5.925 GHz range and are short-range (approximately 300 m) and have a high data rate of 6-27 Mbps.

The vehicle 10 may optionally include an onboard diagnostics port and/or one or more other data communication ports or sockets for wired connections, e.g. USB, HDMI, FireWire (IEEE 1394), etc. or ports or sockets for receiving non-volatile memory cards, e.g. SD (Secure Digital) card, miniSD card or microSD card. These physical data connections may be used to load data onto the memory or to copy data from the memory. For example, the data communication ports may be used to upgrade software, to obtain diagnostics for servicing and maintenance, or to upload configuration data to the memory to configure the vehicle for different types of behaviours.

The self-driving vehicle 10 depicted by way of example in FIG. 1 further includes a Global Navigation Satellite System (GNSS) receiver for receiving satellite signals and for determining a current location of the self-driving vehicle. The GNSS receiver may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

FIG. 1 is a side view of an autonomous ("self-driving") vehicle 10 in accordance with an embodiment of the present invention in which a visor-like display screen 105 moves automatically as a seat 110 (e.g. a front seat, particularly the driver seat) reclines to enable ergonomic viewing and touching by the user/passenger/driver of the display screen while the user/passenger/driver is resting or reclining in the reclined seat.

As depicted in FIG. 1, the seat 110 is movable between an upright seat position and a reclined seat position 110'. The seat may be positioned at any intermediate position as well. The seat has a bottom seat portion (e.g. a seat cushion frame with a seat cushion) and a back portion (e.g. back support frame with cushioned backrest) that is reclinable (i.e. rotatable) relative to the bottom seat portion. The back portion of the seat has a headrest attached thereto that can be raised and lowered relative to the back portion of the seat. The seat may be a manually adjustable or power-adjustable seat with electrically driven motors to translate the seat forward and rearward, upward and downward or to change the angle of reclination. The seat may include a powered or manually adjustable lumbar support adjustment mechanism, an internal seat heater and/or perforations for seat cooling air. The seat may also include an internal massaging device. For the purposes of this specification, "reclined" means that the back portion of the seat is angled (rotated) rearwardly at an angle suitable for resting or sleeping, which may be an angle greater than 90 degrees, greater than 100 degrees, greater than 120 degrees or preferably greater than 150 degrees. In other embodiments, the seat may recline close to 180 degrees, i.e. 160-180 degrees. In the embodiment depicted in FIG. 1, the display screen 105 moves gradually, proportionally or incrementally between a first position and a second position 105' as the seat is reclined.

For the purposes of this specification, references to the "reclining" of the "seat" refers specifically to the rearward rotation of the back portion of the seat relative to the bottom seat portion.

As shown by way of example in FIG. 1, the visor-like display screen 105 is movable between a visor position (first position) configured for viewing by the user when the user is seated in the upright seat position and a ceiling position (second position) for viewing by the user when the user is seated in the reclined seat position. The reclined seat position may be a different angle from what is shown in the figure. The reclined seat position may be substantially horizontal or angled with respect to the horizontal as shown in the figure. The display 105 in the visor position acts as a sun-shading visor. The display may partially transparent, e.g. a transparent OLED display screen configured to be dynamically shaded to selectively block incoming sunlight or headlights. The display in the second position 105' may be substantially parallel to the ceiling of the cabin of the vehicle. In the first position 105, the display may be substantially parallel to the windshield of the vehicle. Substantially parallel in one embodiment means that the angle of the display relative to the ceiling may vary from +5 to −5 degrees. In another embodiment, the angle may vary from +10 to −10 degrees, or +20 to −20. The display when mounted "substantially parallel" to the ceiling of the vehicle is thus generally oriented parallel to a direction of travel, i.e. generally parallel to the roadway such that most of the light emitted from the display is generally orthogonal to the direction of travel of the vehicle. Thus, for example, when the vehicle is travelling horizontally over a horizontal roadway, the display in the second position emits light generally vertically downwardly. The display optionally auto-dims in low-light conditions and brightens in bright-light conditions.

The display screen 105 may be a touch-sensitive display. The display may present a graphical user interface that presents various user-selectable vehicle controls and vehicle instrumentation such as a speedometer, tachometer, odometer, fuel gauge, battery charge readout, etc. The display screen 105 may present a virtual dashboard, a map and/or navigation controls, and/or a camera/video feed of the exterior of the vehicle, sound system controls, climate control settings. The display may be user-configurable to present user-selected information that the user wishes to view while reclining. The user may thus monitor the autonomous driving of the vehicle, may provide commands or inputs to modify the self-driving behaviour, may set or change destinations, specify detours, control a climate control system, control an audio system, or interact with other systems and subsystems of the vehicle. In one embodiment, the vehicle includes a microphone and speakers and a camera so that user may video conference via this display. The display screen 105 may move automatically in response to the seat 110 reclining and automatically when the seat is rotated back to the upright position. The display screen 105 may move proportionally as the seat is reclined and returned to the upright position or it may move to discrete locations. The display screen 105 may be manually movable or electrically movable by a motor or actuator. The display screen 105 may be automatically adjusted based on the angle of reclination of the seat to provide an ergonomic viewing angle. In this embodiment, the processor receives a seat angle signal from a seat angle measurement device (e.g. embedded seat angle sensor, camera or other angle-detection device), determines a corresponding screen angle (using an equation, formula, correlation or look-up table) and generates and sends a screen angle drive signal to the screen adjustment mechanism to adjust the screen angle.

As illustrated in FIG. 1, the seat 110 is the driver's seat but it will be appreciated that, in a truly autonomous vehicle, there may be no longer be a "driver's seat" per se with a steering wheel, accelerator pedal and brake pedal, and therefore the technology may be applied to the left or right front seat. In another embodiment, there may be two display screens, a left screen and a right screen that are independently movable in response to reclining of the left and right seats, respectively. In other types of vehicles, there may be reclinable seats in the rear of the cabin and thus this technology may be applied to those reclinable rear seats as well.

Figure 2:
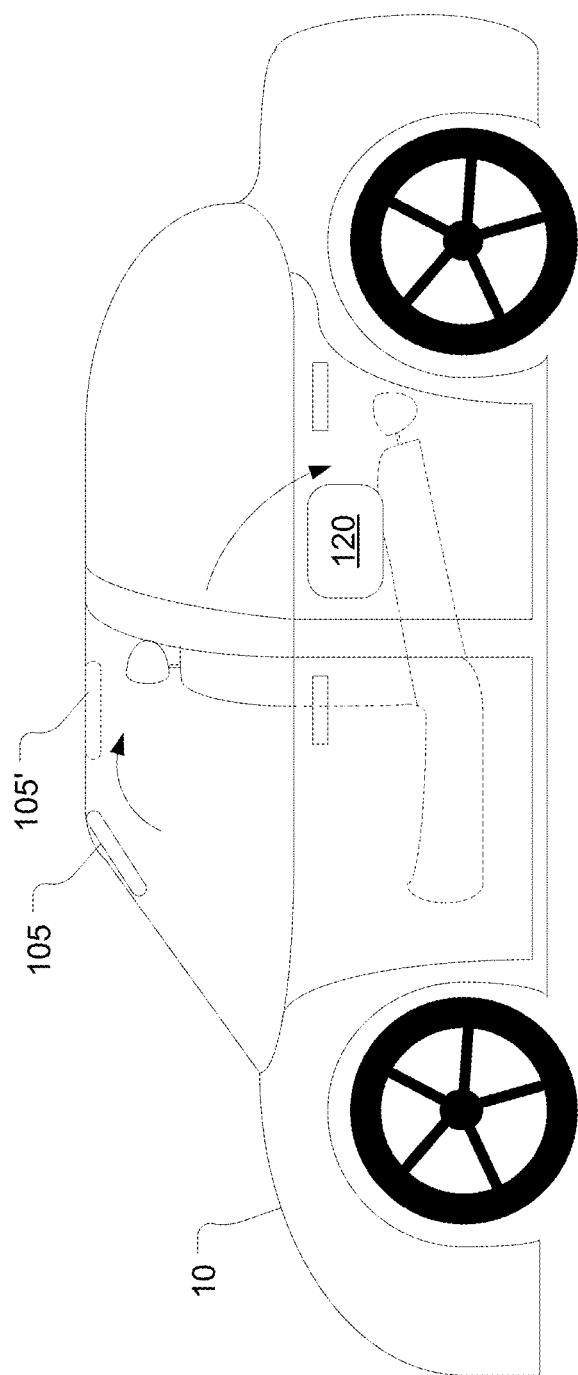
FIG. 2 is a side view of the autonomous vehicle of FIG. 1 further having a side mounted display screen.

FIG. 2 is a side view of the autonomous vehicle 10 of FIG. 1 further having a side-mounted display screen 120. The side-mounted display screen 120 may display dashboard elements, vehicle controls, vehicle instrumentation, climate control settings, audio system controls, etc. The side-mounted display screen 120 may be used by the passenger/user in addition, or in lieu of, the ceiling-mounted display screen 105. For example, the passenger/user may lie on his or her side when dozing or resting or may turn to the side to view or interact with the side-mounted display screen. In one embodiment, the vehicle may sense (e.g. using force sensors) or detect (e.g. using one or more cameras) the posture of the reclining passenger. If the vehicle senses or detects that the passenger is lying on his or her back, the vehicle activates the ceiling-mounted display screen to actively present the vehicle information (e.g. vehicle controls, instrumentation, gauges, etc.) on the ceiling-mounted display screen. If the vehicle senses or detects that the passenger is lying on his or her side facing the door, the vehicle activates the side-mounted display screen to actively present the vehicle information (e.g. vehicle controls, instrumentation, gauges, etc.) on the side-mounted display screen. The information and user-selectable controls that are displayed on the side-mounted display may be user-configurable.

Figure 3:
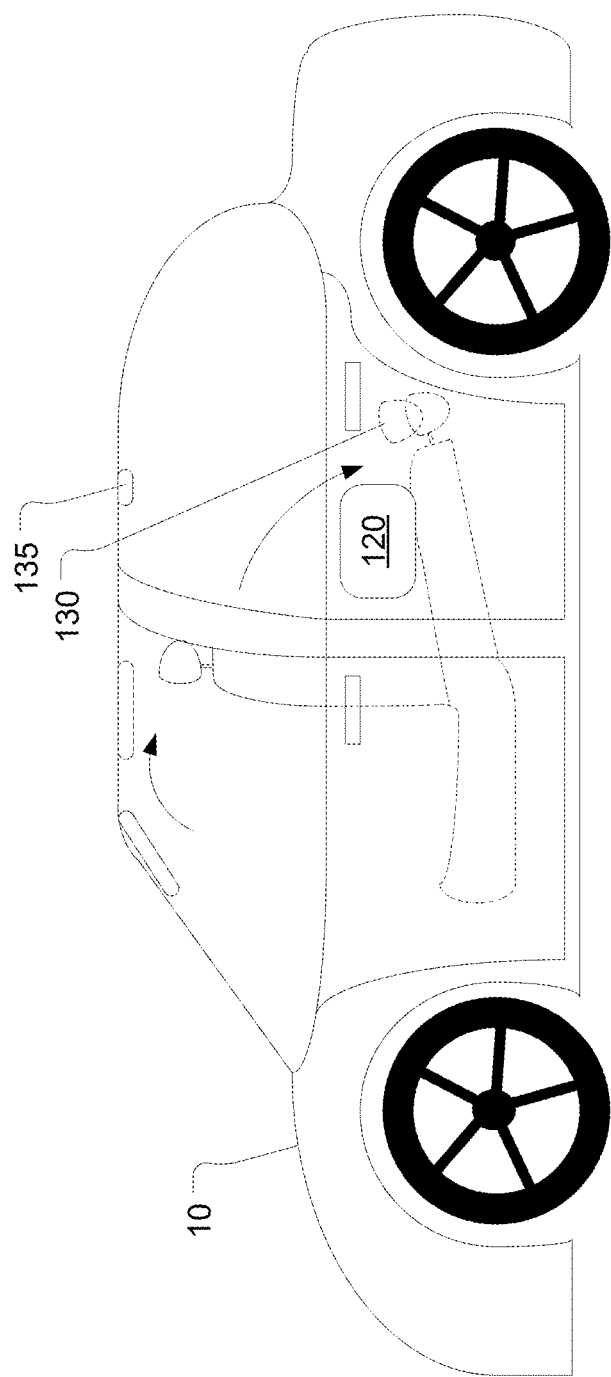
FIG. 3 is a side view of the autonomous vehicle of FIG. 1 further having a passenger-monitoring camera and an automatically adjusting head rest.

FIG. 3 is a side view of the autonomous vehicle 10 of FIG. 1 further having a passenger-monitoring camera 135 and an automatically adjusting head rest 130. In the embodiment of FIG. 3, the passenger-monitoring camera 135 detects a position or posture of the user's head and, in cooperation with a microprocessor, generates a signal to one or more actuators, motors or servos to automatically adjust the angle in one, two or three dimensions and/or position and/or firmness of the head rest 130. This headrest adjustment makes it more comfortable for the passenger to sleep or rest. The firmness of the headrest may also be automatically adjusted using an inflatable pneumatic bladder or multiple inflatable cells and/or actuators that change the shape of the headrest. The headrest may optionally be heated or cooled. A camera may detect if the passenger is sleeping on his or her back or side in which case the headrest may be adjusted for either a side sleeping posture or a back sleeping posture.

Figure 4:
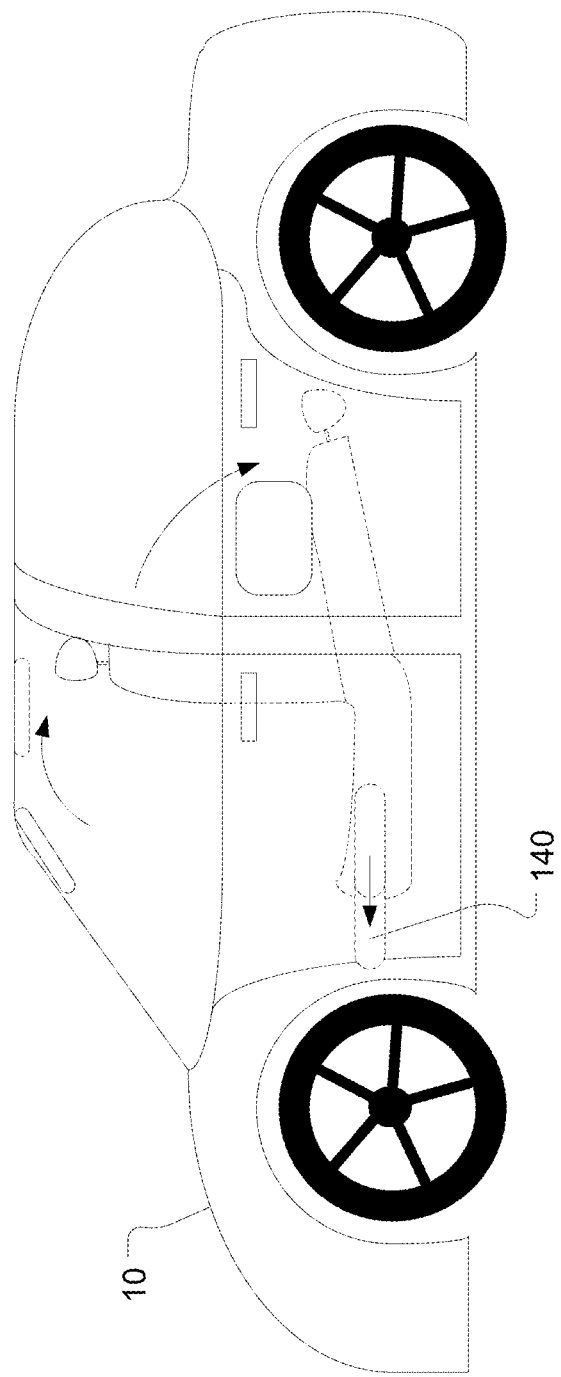
FIG. 4 is a side view of the autonomous vehicle of FIG. 1 further having a leg-supporting extension or leg rest that extends from the seat when reclined.

FIG. 4 is a side view of the autonomous vehicle 10 of FIG. 1 further having a leg-supporting extension or leg rest 140 that extends from the seat 110 when the seat 110 is reclined. The leg rest 140 may extend in proportion to the angle of reclination or may occur only once the seat has reclined beyond a predetermined angle.

Figure 5:
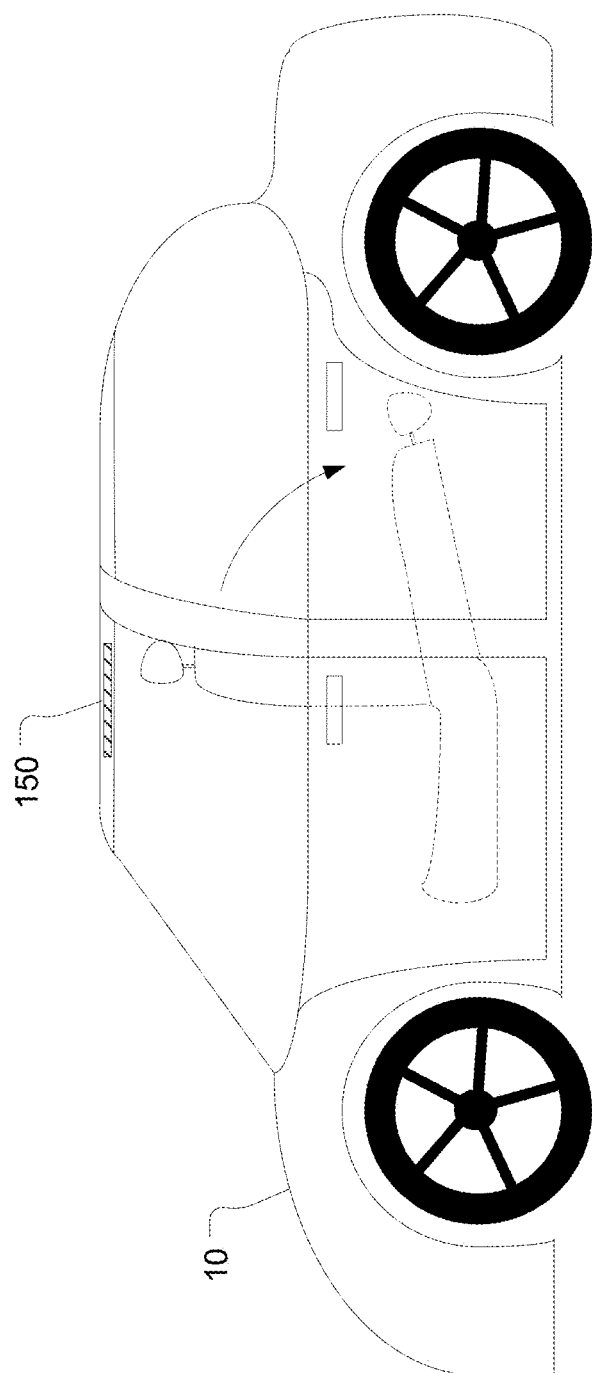
FIG. 5 is a side view of the autonomous vehicle of FIG. 1 further having a sunroof display screen.

FIG. 5 is a side view of the autonomous vehicle 10 of FIG. 1 further having a sunroof display screen 150. In one embodiment, the sunroof display screen 150 comprises a transparent touch-sensitive display, e.g. a transparent OLED display. The sunroof display screen 150 may be movable like a conventional sunroof, e.g. it may translate (or slide) from a closed (substantially hermetic) position to an open (open-air) position or to intermediate positions therebetween. The sunroof display screen 150 may also tilt. The sunroof display screen 150 may optionally be covered by a sliding shade. The sunroof display screen 150 may present user interface elements (user-selectable buttons, toggles, elements, etc.), dashboard elements, gauges, dials, instrumentation, vehicle controls, camera or video imagery, etc. Instead of a sunroof display screen 150, the display may be a display screen mounted to the ceiling of the vehicle cabin. The ceiling-mounted display screen may be fixed or movable.

Figure 6:
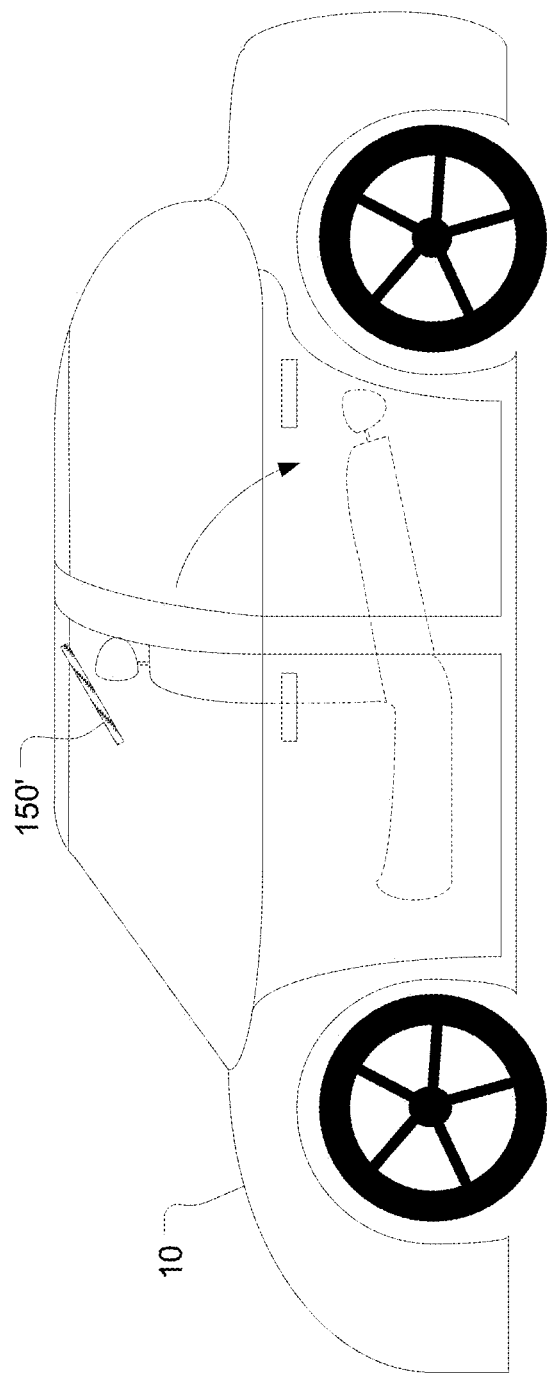
FIG. 6 is a side view of the autonomous vehicle of FIG. 5 in which the sunroof display screen is also pivotable.

FIG. 6 is a side view of the autonomous vehicle 10 of FIG. 5 in which the sunroof display screen 150 is also pivotable into a pivoted position 150'. The screen 150 may be manually pivotable or electrically pivotable by a motor, servo or actuator. The screen 150 may be automatically adjusted based on the angle of reclination of the seat to provide an ergonomic viewing angle. The angle of the screen may be automatically adjusted based on a posture or angle of the passenger as determined by an in-cabin camera or other sensor.

Figure 7:
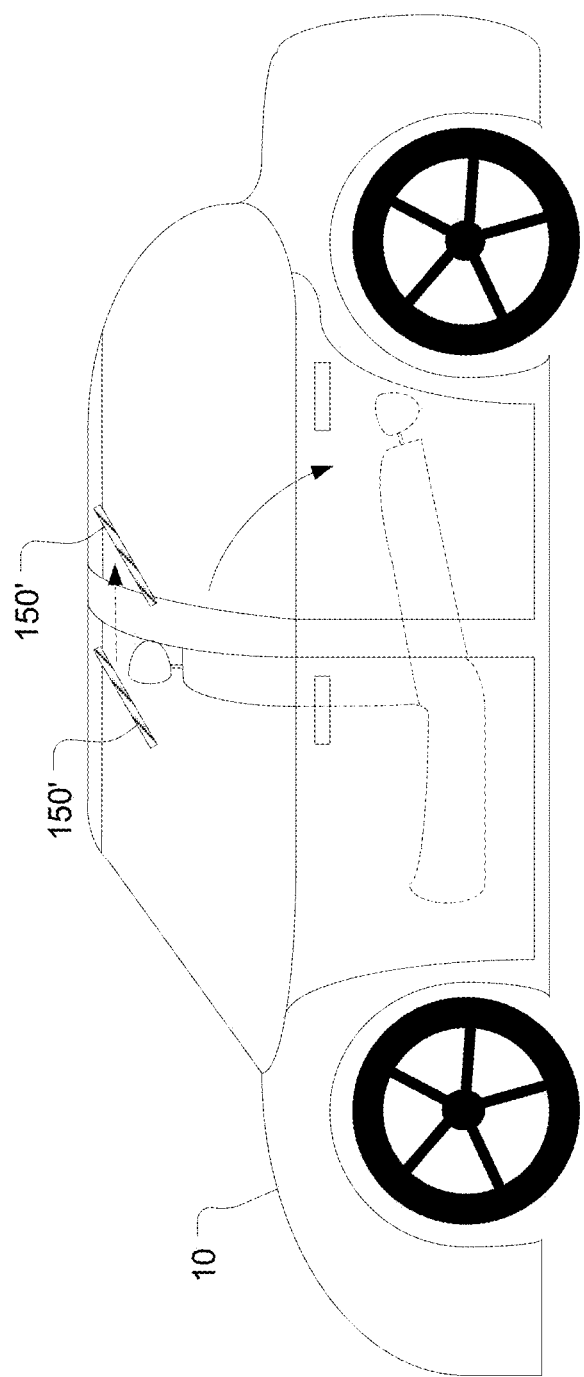
FIG. 7 is a side view of the autonomous vehicle of FIG. 6 in which the sunroof display screen is also slidable.

FIG. 7 is a side view of the autonomous vehicle 10 of FIG. 6 in which the sunroof display screen 150 is also slidable between a forward pivoted position 150' and a rearward pivoted position 150". The screen 150 may be automatically slidable or manually slidable through one or more tracks, rails, grooves or guides running along the ceiling. The translational position of the screen may be automatically adjusted based on a posture or angle of the passenger as determined by an in-cabin camera or other sensor.

Figure 8:
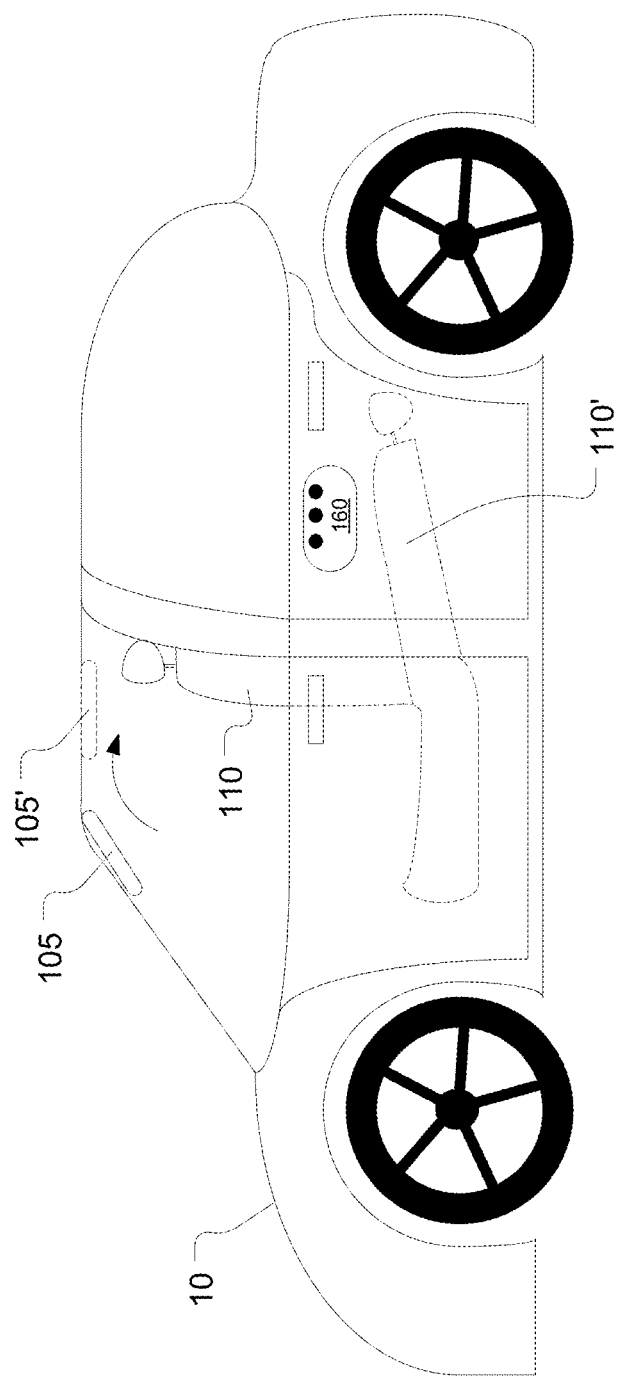
FIG. 8 is a side view of the autonomous vehicle of FIG. 1 further comprising a vehicle-integrated continuous positive airway pressure (CPAP) ventilator for a sleeping passenger.

FIG. 8 is a side view of the autonomous vehicle 10 of FIG. 1 further comprising a vehicle-integrated continuous positive airway pressure (CPAP) ventilator 160 for a sleeping passenger. The CPAP ventilator may be fluidly connected to the heating, ventilation and air conditioning (HVAC) system of the vehicle so that the CPAP ventilator may receive airflow directly from the fan or air circulation subsystem of the HVAC system of the vehicle.

Figure 9:
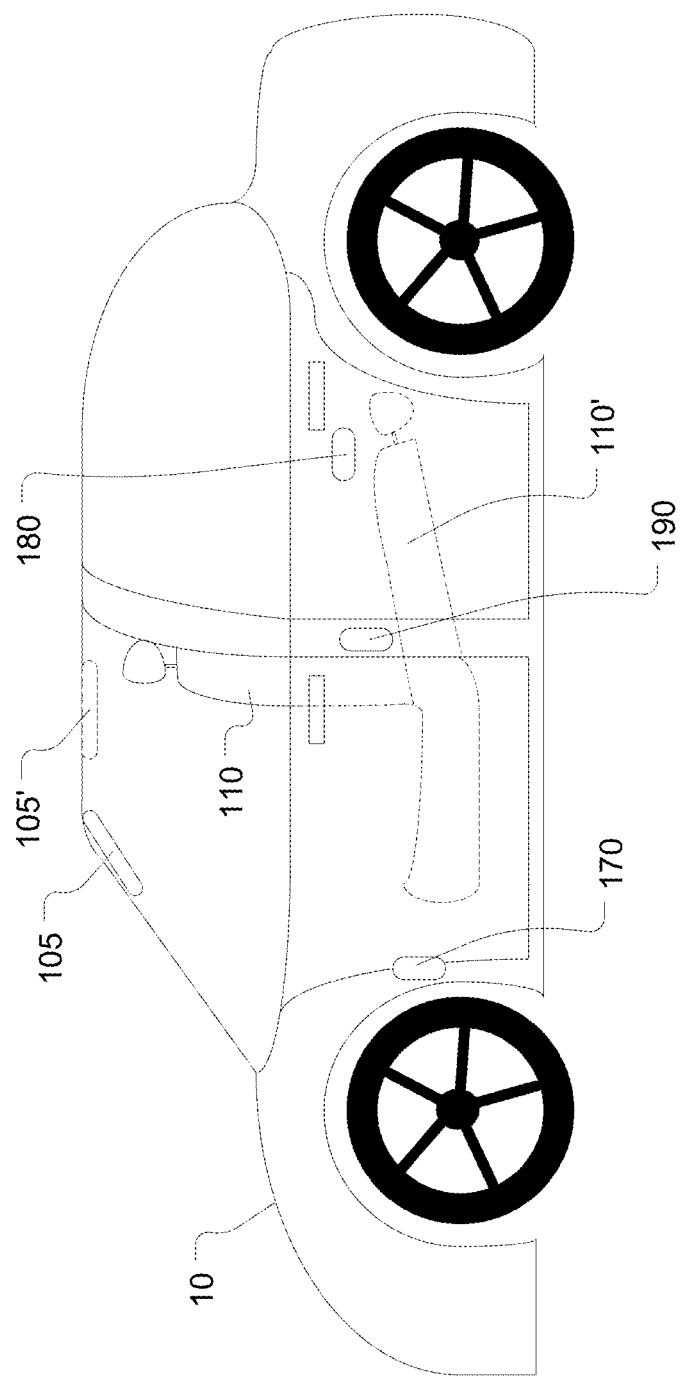
FIG. 9 is a side view of the autonomous vehicle of FIG. 1 having lower mounted airbags adjacent the reclined passenger.

FIG. 9 is a side view of the autonomous vehicle 10 of FIG. 1 having lower mounted airbags 170, 180, 190 adjacent the reclined passenger which are in addition to the usual or normal array of airbags in the steering wheel, dashboard, side columns, pillars or posts, etc. The first lower airbag 170 is positioned to protect the legs or knees of the reclined passenger. The second lower airbag 180 is positioned to protect the head of the reclined passenger. The third lower airbag is positioned to protect the shoulder or torso of the reclined passenger. The first lower airbag 170 may be positioned on the side of the foot well. The second lower airbag 180 may be positioned in the rear door panel i.e. below the rear side window. The third lower airbag 190 may be positioned below the plane of the side windows in the vertical post or column between the front and rear doors.

Other airbags may be placed in other locations to further protect the reclined passenger.

Figure 10:
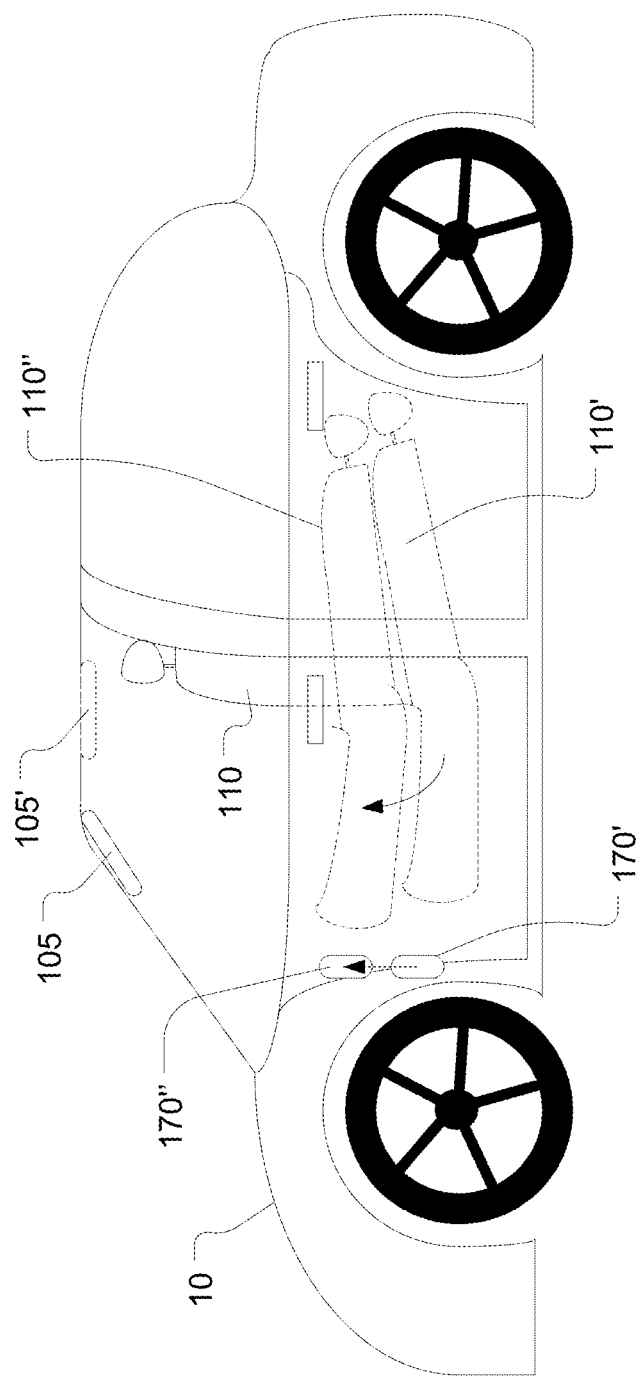
FIG. 10 is a side view of the autonomous vehicle of FIG. 9 in which the airbags are automatically relocated based on the position of the passenger.

FIG. 10 is a side view of the autonomous vehicle 10 of FIG. 9 in which the airbags 170 are automatically relocated (i.e. displaced) based on the position of the passenger. In this specific example, the airbag 170 is raised and lowered depending on the position of the reclined seat to optimize protection for the passenger. For example, in one embodiment, the airbag 170 automatically moves from lower position 170' to upper position 170" when the reclined seat 110 moves between a first reclined position 110' and a second reclined position 110". In a variant, one or more airbags may be activated or deactivated in addition or in lieu of moving the airbags.

Figure 11:
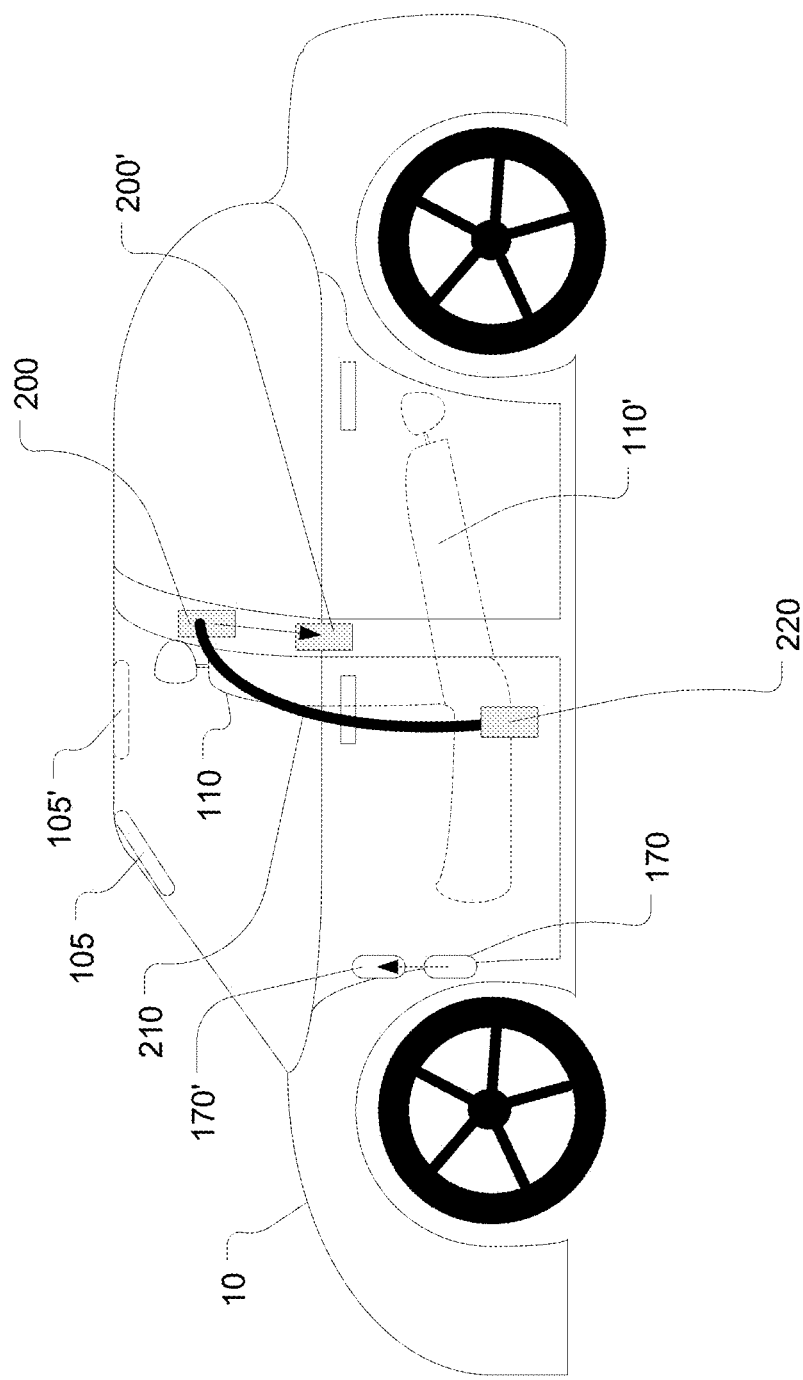
FIG. 11 is a side view of the autonomous vehicle of FIG. 10 in which the seatbelt is automatically relocated based on the position of the passenger.

FIG. 11 is a side view of the autonomous vehicle 10 of FIG. 10 in which the seatbelt is automatically relocated based on the position of the passenger. In this example embodiment, the seatbelt 210 is held by an upper seatbelt holder 200, i.e. a D-shaped pillar loop for guiding the belt from the retractor, and a lower seatbelt holder 220, i.e. a seatbelt receptacle for detachably connecting to the seatbelt buckle. The upper seatbelt holder 200 moves to a lowered position 200' automatically when the seat is reclined to position 110'. For example, the holder 200 slides or translates in a vertical groove, slot or channel along the pillar. In a variant, the groove, slot or channel may be curved. The automatic airbag and seatbelt relocation may occur proportionally to the angle of reclination of the seat. An automatic seatbelt tensioning device automatically re-applies tension to the seatbelt 210 when relocated to remove any unwanted slack in the seatbelt. The position of the seatbelt may be automatically adjusted based on a posture or angle of the passenger as determined by an in-cabin camera or other sensor.

Figure 12:
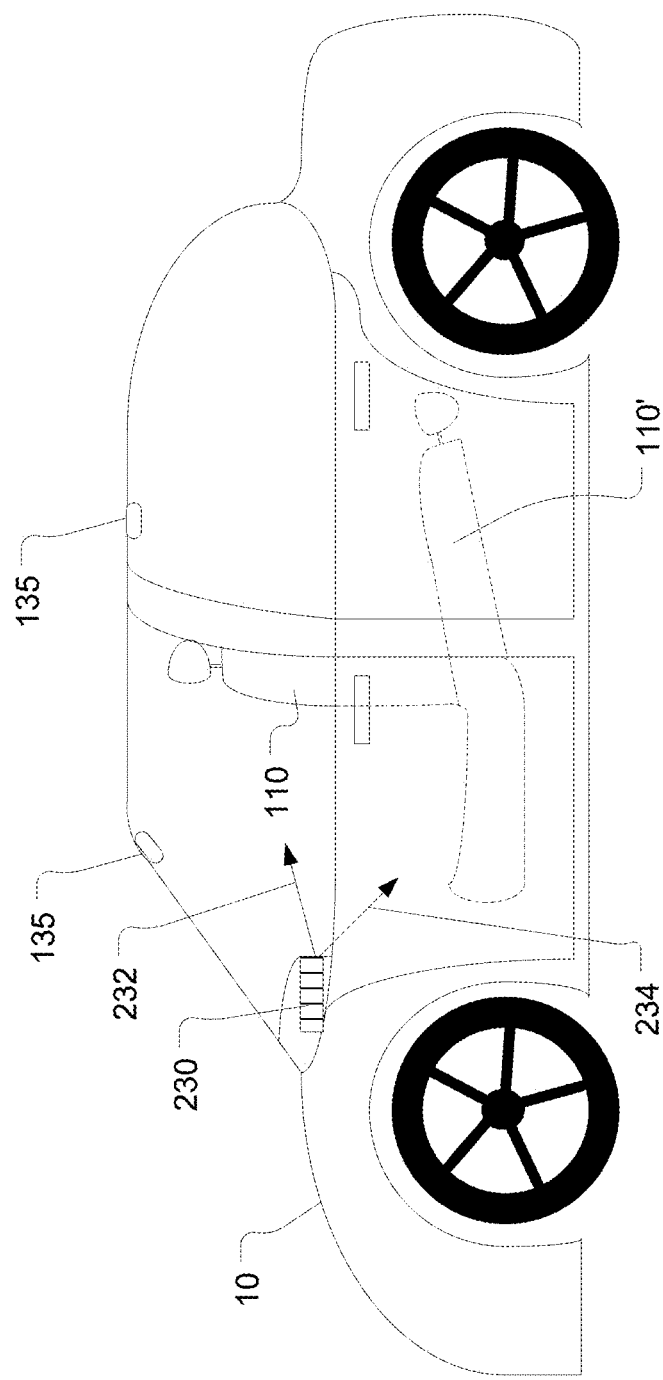
FIG. 12 is a side view of the autonomous vehicle of FIG. 1 further having passenger-monitoring cameras for automatically adjusting air vents based on passenger position.

FIG. 12 is a side view of the autonomous vehicle 10 of FIG. 1 further having passenger-monitoring cameras 135 for automatically adjusting air vents based on passenger position. In this embodiment, there are two cameras 135 although the number and position of the cameras may be varied. One or more of the air vents 230 may be automatically adjusted in response to the detected angle of reclination of the seat(s). In another embodiment, the cameras may be thermal imaging or infrared cameras (e.g. FLIR cameras) capable of generating a thermal image of the passenger(s) and/or of the seats in order to direct cooling air or warm air in the optimal direction(s) to maximize the comfort of the passengers. By generating and updating a time-varying temperature map of the cabin, seat or passenger, the vehicle can adjust the cooling and warming air flow to cool and warm the cabin evenly or to cool and warm those areas that are too warm or too cold. It also avoids the problem of overly cooling or heating due to immobile vents. The processor may thus adjust the climate control, the direction of the vents to maximize passenger comfort while the passenger is sleeping or resting. In a variant, the processor may raise or lower sunshades or tint windows in response to the camera detecting that the sun is shining directly on the passenger.

Figure 13:
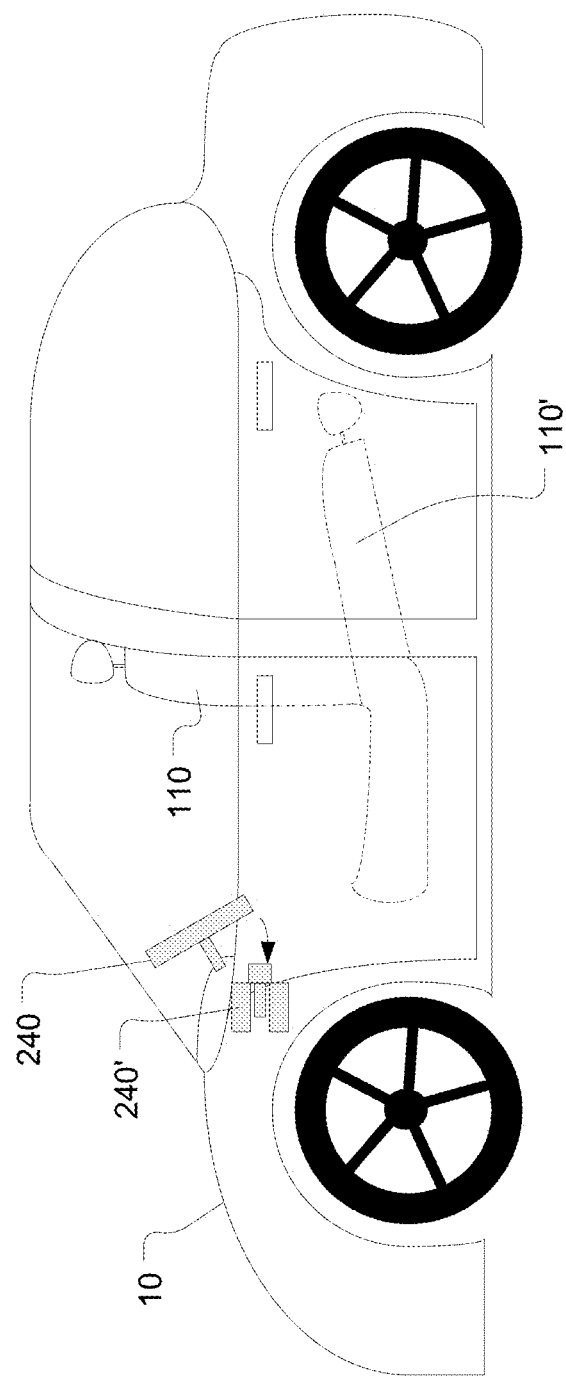
FIG. 13 is a side view of the autonomous vehicle of FIG. 1 further having an automatically folding steering wheel.

FIG. 13 is a side view of the autonomous vehicle 10 of FIG. 1 further having an automatically folding steering wheel 240 which folds automatically into a folded configuration 240'. As illustrated, the folded configuration may also be retracted or partially retracted into a cavity or recess in or under the dashboard. The fold signal and the unfold signal may be automatically generated in response to reclination of the seat beyond a predetermined angle of reclination or by activating an autonomous driving mode. It will be appreciated that the autonomous driving mode may itself be triggered by detecting that the seat (driver's seat) has reclined beyond a predetermined angular threshold. In another embodiment, the vehicle can sense that the driver has fallen asleep or has become drowsy using biometric sensors, cameras or by sensing that the user is no longer providing driving input to the vehicle. In a variant, the vehicle may have left and right foldable steering wheels to enable human driving while sitting in either the left seat or the right seat such that only one of the two steering wheels is unfolded and thus useable at any one time.

In accordance with another embodiment, the vehicle may include one or more dynamically compensating seats or motion-compensating seats. One benefit of the motion-compensating seats is to minimize motion sickness for the passengers riding, sleeping or resting in the vehicle. The motion-compensating seats also improve the general comfort of the ride for the passengers sitting in those seats.

Figure 14:
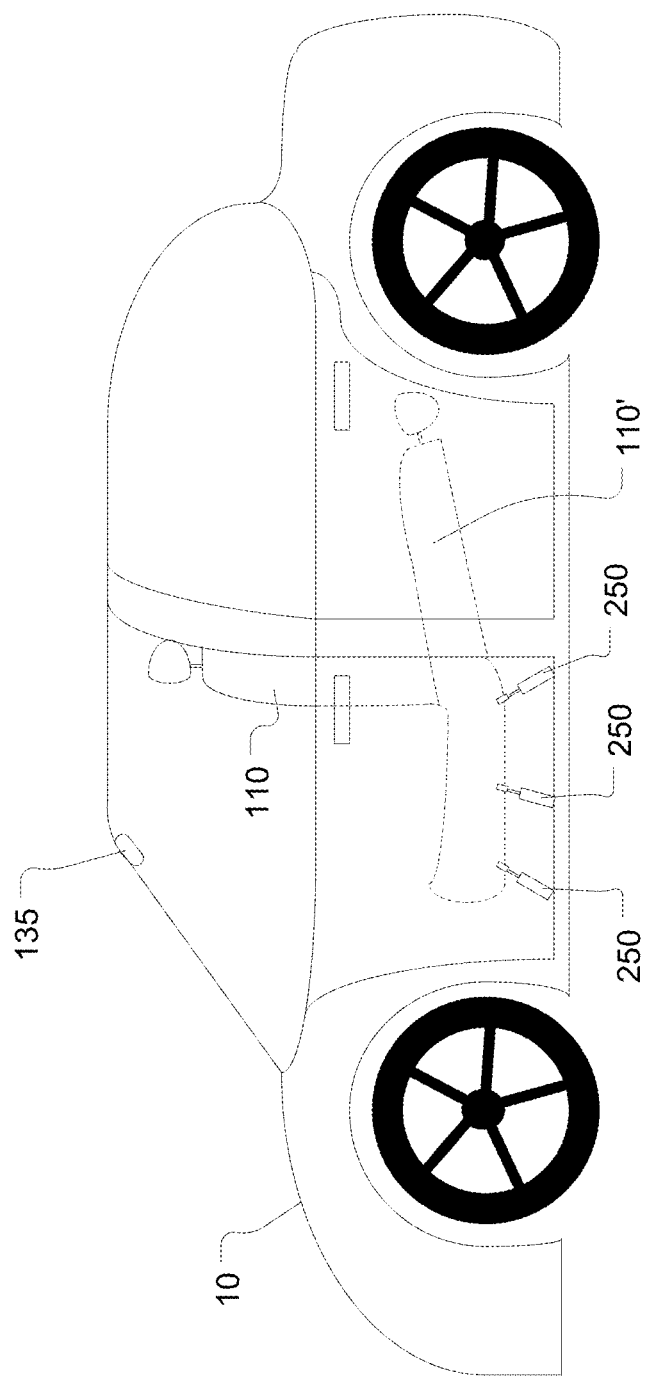
FIG. 14 is a side view of the autonomous vehicle of FIG. 1 further having actuators for automatically adjusting an orientation of the seat in the reclined position to compensate for vehicle movement.

FIG. 14 is a side view of the autonomous vehicle 10 of FIG. 1 further having a plurality of actuators 250 (e.g. hydraulic, pneumatic or electric actuators) for automatically adjusting an orientation of the seat to compensate for vehicle movement. In a main embodiment, the automatic adjustment of the orientation of the seat is performed on the reclined seat position to minimize and attenuate unwanted motion for the resting or sleeping passenger. In the illustrated embodiment, the actuators are connected to the base of the seat to fully support the seat, eliminating the traditional seat tracks that support the seat. In another embodiment, the actuators support a platform or frame having or supporting seat tracks. In one embodiment, there are six actuators to move and support the seat. The actuators enable motion for pitch and roll. The actuator may optionally also provide a yaw motion as well. The seat may be supported and moved by a different number of actuators, e.g. three, four, five, seven, eight, etc. In addition, the seats may include pneumatically inflatable bladders to further constrain the passenger during a sharp turn or hard braking manoeuvre.

Figure 15:
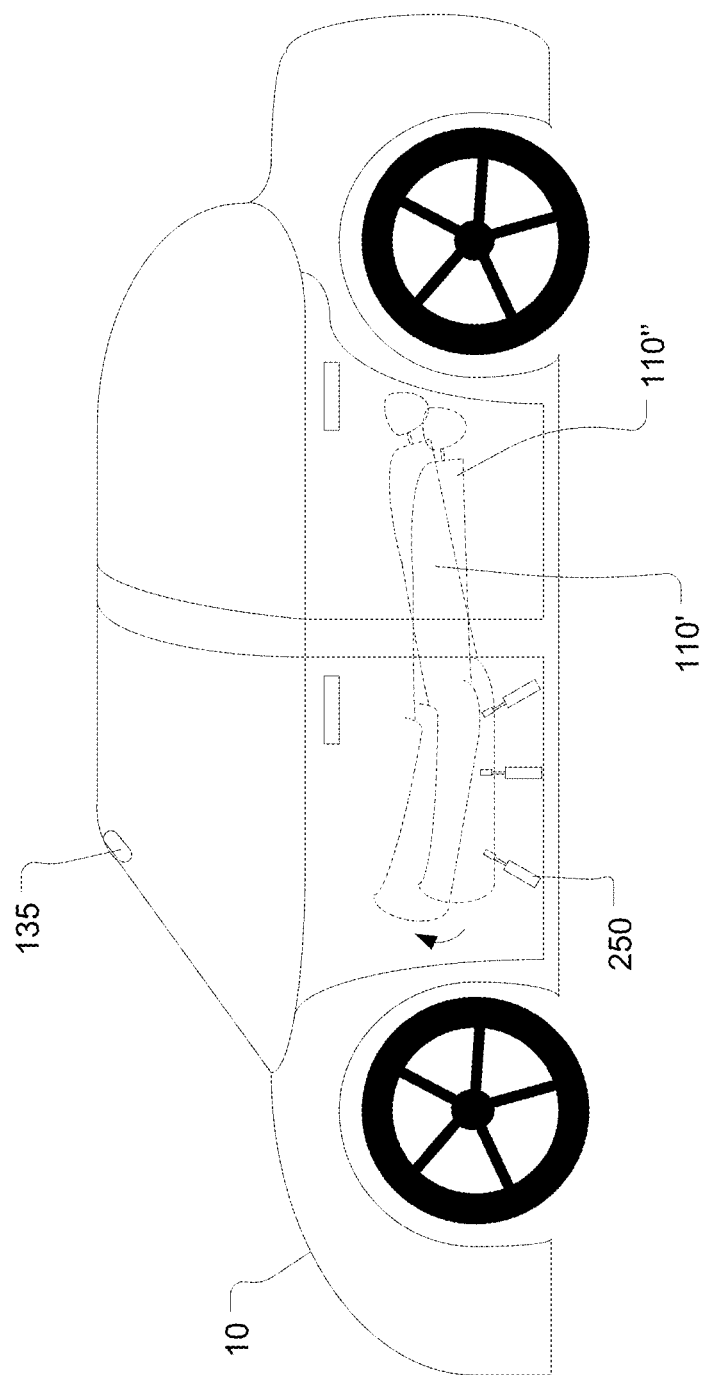
FIG. 15 is a side view of the autonomous vehicle showing compensation for the pitch of the reclined seat during braking.

FIG. 15 is a side view of the autonomous vehicle 10 showing compensation for the pitch of the reclined seat during braking or hard acceleration. For an autonomous vehicle, unlike a human driven vehicle, the vehicle's manoeuvres (turns, braking, acceleration) are known in advance by the processor of the vehicle before the manoeuvre is actually performed because the route is programmed. Thus, for example, a vehicle approaching a stop sign knows in advance (i.e. the processor can predict) that the vehicle will be braking and thus can calculate the deceleration on the body of the passenger e.g. by using factors such as the seat angle, the mass of the passenger (measured by a weight-measuring sensor embedded in the seat and even the posture of the passenger as seen by an in-cabin camera or as sensed by sensors embedded in the seat). Since the processor of the vehicle predicts or knows in advance the turns, acceleration and braking to be performed imminently, the vehicle processor can pre-emptively or proactively transmit signals to the actuators 250 to commence compensatory movements to coincide with the actual vehicle manoeuvre so as to compensate for turns, braking and acceleration. Because forces are able to be predicted in an autonomous vehicle, the processor of the autonomous vehicle can proactively initiate force compensation. For example, the vehicle processor may send a signal to the actuator to begin compensation of the pitch of the seat at the same time or just prior to sending the braking signal to the braking system of the vehicle (depending on the relative lag times of the brakes and of the seat actuators). For example, the seat can be tilted sideways to compensate for the centrifugal force exerted on the passenger during a sharp turn. Knowing the predicted velocity of the vehicle and the radius of the turn to be made, the radial acceleration can be computed and thus the centrifugal force on the passenger mass can be determined by the processor. The processor can then signal the actuators pre-emptively to compensate for the predicted centrifugal force. As the vehicle enters the turn, the actuators tilt the seat to compensate for the centrifugal force.

Figure 16:
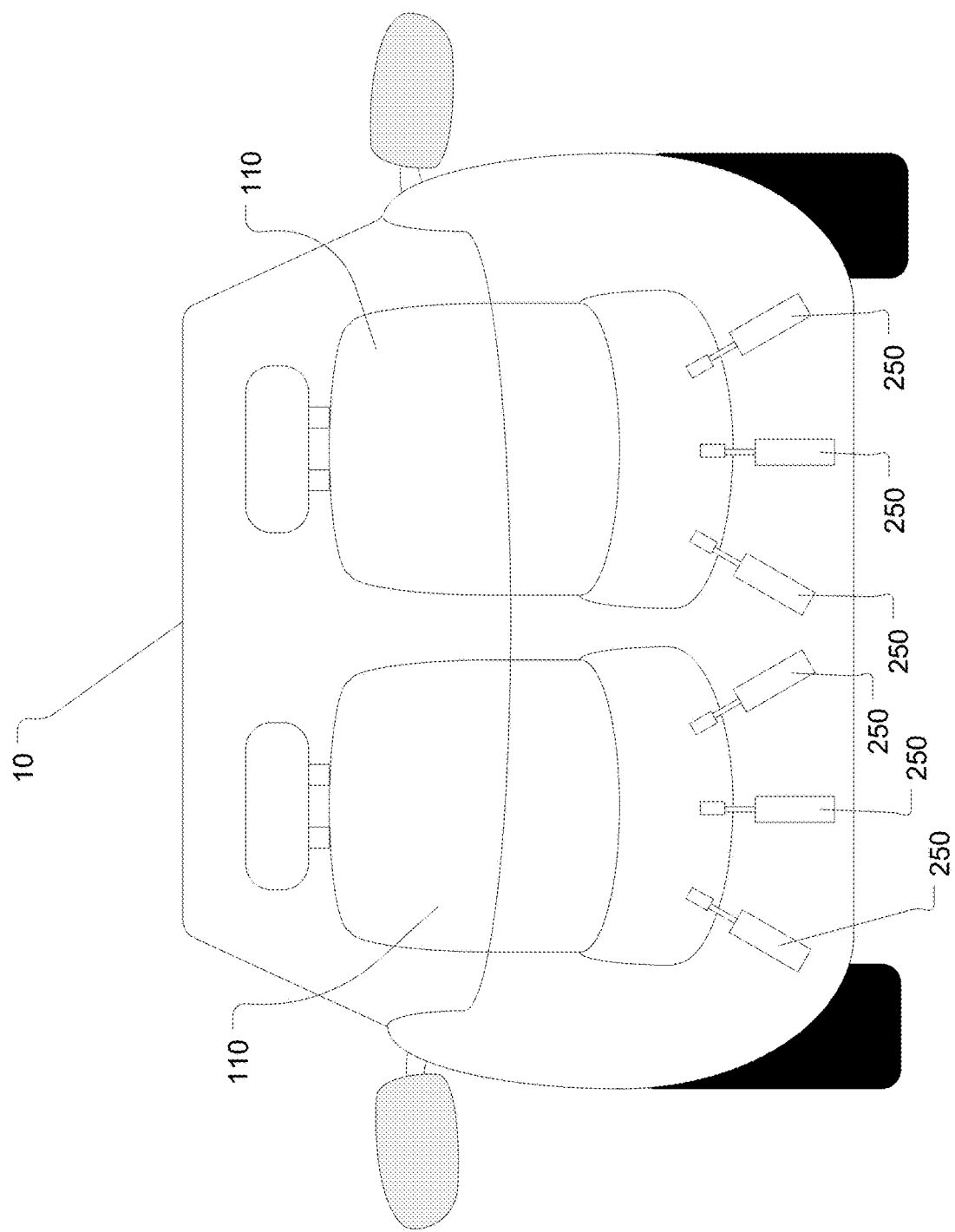
FIG. 16 is a front view of an autonomous vehicle showing seat actuators for automatically adjusting an orientation of the seat to compensate for vehicle movement.

FIG. 16 is a front view of an autonomous vehicle showing actuators 250 for automatically adjusting an orientation of the front seats 110 to compensate for vehicle movement. In this example, the seats 110 are upright although it will be appreciated that the seats may be reclined or partly reclined. These actuators may also be used to raise or lower the seat or to move them forward to rearward. These actuators may also be used to provide shock absorption.

Figure 17:
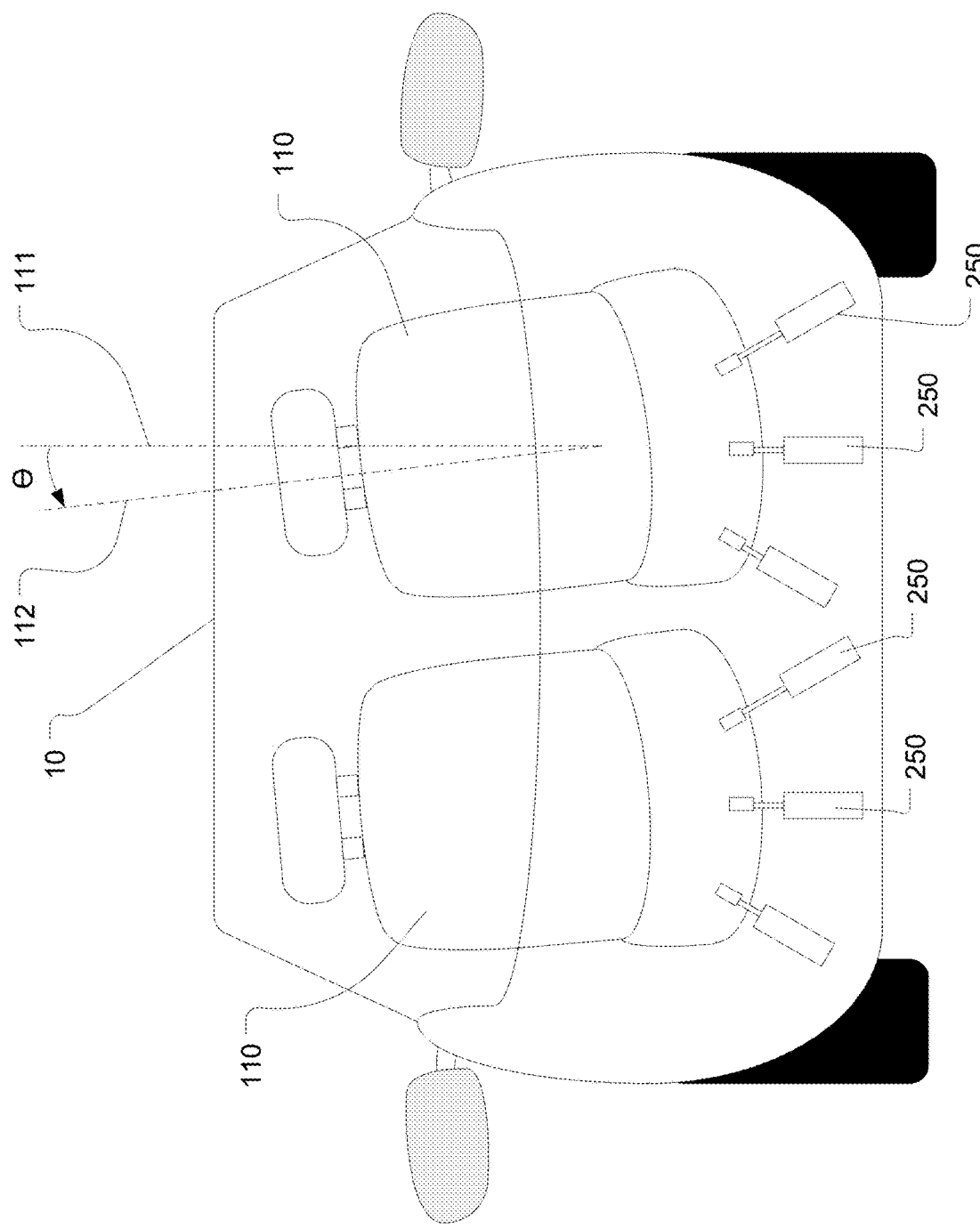
FIG. 17 is a front view of the autonomous vehicle showing seat actuators that compensate for the roll of the vehicle during a turn.

FIG. 17 is a front view of the autonomous vehicle 10 showing compensation for the roll of the vehicle during a turn. In this example, the dynamically compensating seats 110 are tilted sideways (laterally) from a vertical plane or vertical axis 111 by an angle $\ominus$ defined by the tilted axis 112.

The motion compensation by the actuators may also be performed when the vehicle is on an inclined road, e.g. going down a hill or going up a hill. The processor predicts the incline of the road either by detecting the incline using a forward-facing camera, ground-measuring laser or other sensor, by obtaining topology data from a map, or from other vehicles in the vicinity who are sharing such data via vehicle-to-vehicle communications. The processor of the vehicle may also learn and thus develop its own topology map for routes that are frequently taken but for which there is no data, for example, an off-road path to a cottage or camp.

Figure 18A:
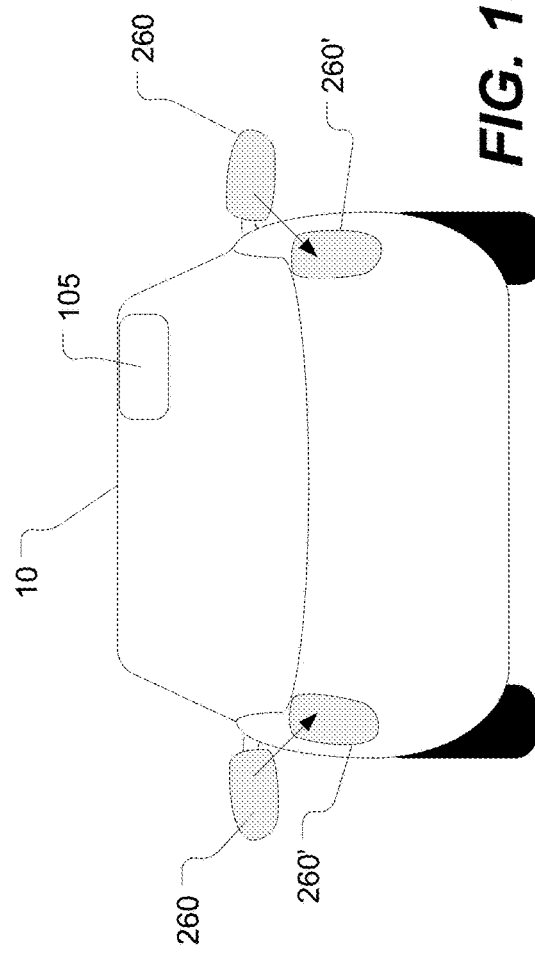
FIG. 18A is a front view of an autonomous vehicle having automatically retracting mirrors when the seats are reclined.
Figure 18B:
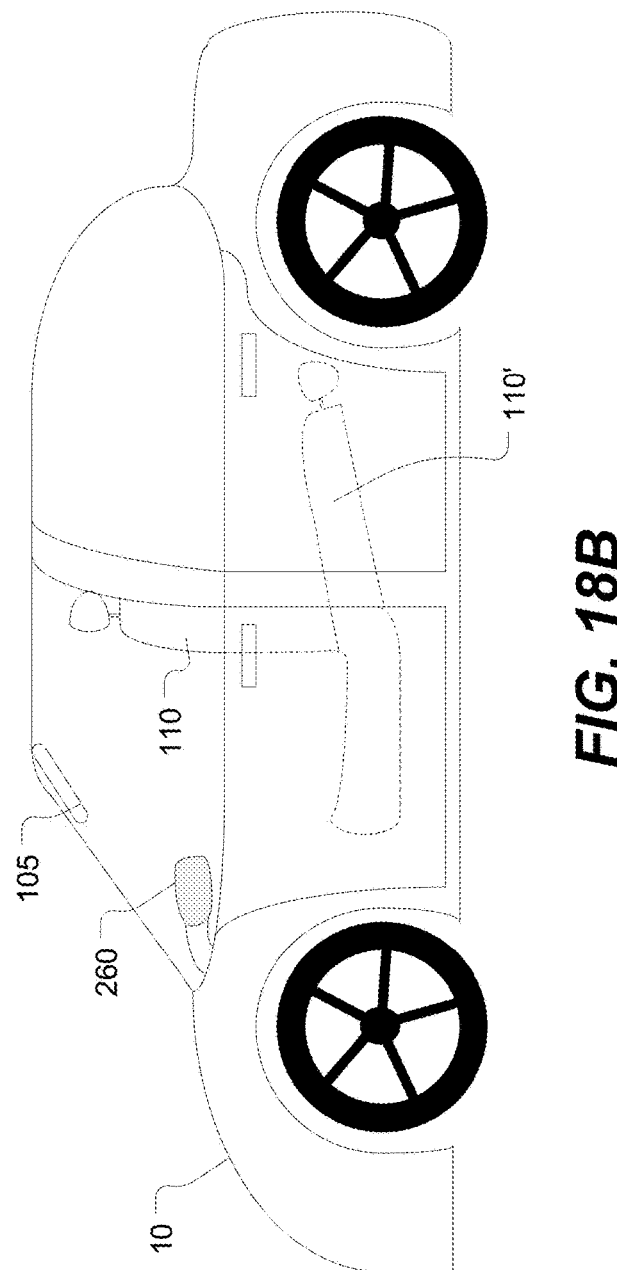
FIG. 18B is a side view of the autonomous vehicle of FIG. 18A.

FIG. 18A and FIG. 18 are front and side views of an autonomous vehicle 10 having automatically retracting side mirrors 260 when the driver's seat 110 is reclined into the reclined position 110'. The side mirrors 260 may be retracted, either fully or partially, into a retracted posture 260' as shown. This retraction of the mirrors may occur automatically when the user reclines the seat (e.g. driver's seat) or when the user activates an autonomous driving mode or when the vehicle automatically switches into autonomous driving mode based on a sensed condition. The retracted position may be a more aerodynamic position and/or a more compact position.

When switching into the autonomous driving mode ("auto-pilot"), the vehicle may automatically make other adjustments or reconfigurations such as tinting or darkening one or more of the windows of the vehicle or raising one or more sunshades to provide a darkened or shaded interior that is a more conducive environment for sleeping, dozing or resting. The vehicle may also use sensors and/or cameras to detect when the passenger has fallen asleep in the reclined seat. Upon detecting that the passenger has fallen asleep, the vehicle can perform a reconfiguration such as darkening or tinting the windows, raising sunshades, shutting off the audio system, adjusting the climate control for a pre-programmed sleeping profile, and/or adjust a vehicle self-driving mode to be least disruptive in terms of noise and/or motion.

The processor of the vehicle may also be configured to wake the sleeping or dozing passenger or passengers. The vehicle may provide a notification, alert or alarm, either audibly or by vibration of the seat, to wake the sleeping user/passenger to notify the user/passenger that the vehicle has arrived at the destination of a programmed route, or alternatively, may wake the user/passenger if there is an issue requiring the user's attention or input, e.g. a decision to stop for fuel or recharging, taking a detour, a mechanical or electrical failure or the like. To wake the passenger, the processor may raise the seat back to the upright position in lieu or in addition to the notification. Algorithms, code and rules for the decision-making steps or actions described above may be performed by a microprocessor, such as the processor 100 described above or by any other suitable microprocessor, microcontroller, computer, computing device, server or group, cluster, network, or confederation of such devices. The processor is thus configured to perform one or various methods or processes of monitoring the seat to determine if the seat has been reclined into a sleeping or resting posture and then adjusting a position of a vehicle display to enable the user to monitor or interact with the vehicle via the vehicle display. The processor is also configured to perform one or more methods of detecting a position of the seat (whether reclined or upright) and then performing a vehicle adjustment such as adjusting the air vents, adjusting the position of an airbag, adjusting a position of a seatbelt, adjusting a position, angle or firmness of a headrest, etc to accommodate the user. The processor can also be configured to wirelessly receive user settings or parameters to customize the vehicle for the particular passenger or group of passengers to be driven in the vehicle. For example, an autonomous vehicle that is a rental car, taxi, limousine, or participating in riding-sharing like Uber or Lyft may receive user preference data over the air prior to the user embarking into the vehicle. The user preference data may include a sleep profile specifying how the vehicle is to be configured if the user/passenger falls asleep. This may include settings for temperature, sunshades, posture of the seat, firmness of the headrest, whether to periodically activate an internal massager or not, what type of alarm or notification to provide on arrival at the destination, whether to automatically raise the seat or not, etc.

In another embodiment, the processor cooperates with a camera and facial recognition software to recognize the user/passenger and to automatically upload previously stored user preference settings associated with the recognized user/passenger. In a variant, the processor may cause a speaker to emit an audible message to confirm that the user/passenger wishes to use his or her standard settings. Such a spoken message may be, for example, a welcome message such as: "Welcome Mr. Smith, would you like us to use your usual vehicle settings today?" Using speech recognition, the processor determines from the user's verbal reply (e.g. "yes" or "no") whether to use the standard settings defined by the previously stored user preference data.

The sleep profile may also be learned by the processor implementing a learning algorithm or artificial intelligence by noting the user settings over a period of time. In one implementation, the processor cooperates with a camera and facial recognition software to recognize the user in order to store the settings for the particular user. The vehicle may also use a mobile phone identifier of the passenger as a further means of identifying the user.

These methods can be implemented in hardware, software, firmware or as any suitable combination thereof. That is, if implemented as software, the computer-readable medium comprises instructions in code which when loaded into memory and executed on a processor of a computer causes the computer to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A vehicle comprising:
a seat movable between an upright position and a reclined position;
a processor to process user preference data for a user, the user preference data includes a sleep profile specifying how to automatically configure the vehicle in response to detecting that the user has fallen asleep;
an automatically adjustable headrest connected to the seat, the automatically adjustable headrest being automatically adjusted for a posture of a head of the user when the user is reclined in the reclined position, wherein the headrest comprises an inflatable pneumatic bladder or multiple inflatable cells or one or more actuators to change a shape of the headrest; and
wherein the automatically adjustable headrest is automatically adjusted in response to a camera detecting that the user is sleeping or resting either on his or her back or on his or her side, the headrest being adjusted for either a side sleeping posture or a back sleeping posture.

2. The vehicle of claim 1 wherein the headrest is adjustable in angle and position.

3. The vehicle of claim 1 wherein the headrest is heated.

4. The vehicle of claim 1 wherein the headrest is cooled.

5. The vehicle of claim 1 further comprising a vehicle-integrated continuous positive airway pressure (CPAP) ventilator.

6. The vehicle of claim 1 wherein the vehicle-integrated continuous positive airway pressure (CPAP) ventilator is connected to an HVAC system of the vehicle.

7. The vehicle of claim 1 further comprising a processor executing facial recognition software and cooperating with the camera to recognize the user, the processor being configured to automatically access the user preference data to automatically configure the vehicle for the user.

8. The vehicle of claim 7 further comprising a speaker to emit an audible message to ask that the user confirm that settings specified by the user preference data are to be used.

9. The vehicle of claim 1 further comprising a seatbelt, an upper seatbelt holder mounted to a vehicle pillar and a lower seatbelt holder, wherein the upper seatbelt holder is automatically moved from an upper position to a lowered position when the seat is reclined into the reclined position.

10. The vehicle of claim 1 further comprising a first lower airbag positioned on a side of a foot well and further comprising a second lower airbag positioned in a rear door panel below a rear side window, wherein the airbags are automatically repositioned in response to the seat moving between the upright position and the reclined position.

11. The vehicle of claim 1 further comprising a thermal imaging camera or infrared camera to generate a thermal image of the user to thereby enable a processor to adjust a climate control and a direction of air vents to direct cool air or warm air toward the user.

12. A vehicle comprising:
a seat movable between an upright position and a reclined position;
a seatbelt, an upper seatbelt holder mounted to a vehicle pillar and a lower seatbelt holder, wherein the upper seatbelt holder is automatically moved from an upper position to a lowered position when the seat is reclined into the reclined position;
an automatically adjustable headrest connected to the seat, the automatically adjustable headrest being automatically adjusted for a posture of a head of a user when the user is reclined in the reclined position; and
wherein the automatically adjustable headrest is automatically adjusted between a side sleeping posture and a back sleeping posture, wherein the headrest comprises an inflatable pneumatic bladder or multiple inflatable cells or one or more actuators to change a shape of the headrest.

13. The vehicle of claim 12 further comprising a first lower airbag positioned on a side of a foot well and further comprising a second lower airbag positioned in a rear door panel below a rear side window, wherein the airbags are automatically repositioned in response to the seat moving between the upright position and the reclined position.

14. A vehicle seat movable between an upright position and a reclined position, the vehicle seat comprising:
an automatically adjustable headrest connected to the seat, the automatically adjustable headrest being automatically adjusted for a posture of a head of a user when the seat is in the reclined position, wherein the headrest comprises an inflatable pneumatic bladder or multiple inflatable cells or one or more actuators to change a shape of the headrest;
wherein the automatically adjustable headrest is automatically adjusted in response to detecting that the user is lying either on his or her back or on his or her side, the headrest being adjusted for either a side sleeping posture when the user is lying on his or her back or a back sleeping posture when the user is lying on his or her side; and wherein the headrest is heated or cooled.

15. The vehicle seat of claim 14, wherein the firmness of the headrest is adjusted for the side sleeping posture or the back sleeping posture.

\* \* \* \* \*